US010360078B2

(12) United States Patent
Bhatnagar et al.

(10) Patent No.: US 10,360,078 B2
(45) Date of Patent: Jul. 23, 2019

(54) OBJECT POOL LIBRARY FOR LOCKLESS AND SEARCHLESS EXCHANGE OF INFORMATION ACROSS MULTIPLE COMPONENTS

(71) Applicant: Guavus, Inc., San Mateo, CA (US)

(72) Inventors: Sumit Bhatnagar, San Mateo, CA (US); Mohit Gupta, Ghaziabad (IN); Sucheta Dahiya, Faridabad (IN); Priyanka Bhaskar, New Delhi (IN)

(73) Assignee: GUAVUS, INC., San Mateo, CA (US)

( * ) Notice: Subject to any disclaimer, the term of this patent is extended or adjusted under 35 U.S.C. 154(b) by 189 days.

(21) Appl. No.: 15/408,566

(22) Filed: Jan. 18, 2017

(65) Prior Publication Data

US 2018/0203745 A1    Jul. 19, 2018

(51) Int. Cl.
*G06F 9/52* (2006.01)
*G06F 9/50* (2006.01)

(52) U.S. Cl.
CPC .............. *G06F 9/52* (2013.01); *G06F 9/5005* (2013.01); *G06F 9/524* (2013.01)

(58) Field of Classification Search
None
See application file for complete search history.

(56) References Cited

U.S. PATENT DOCUMENTS

| 6,546,443 | B1 * | 4/2003 | Kakivaya | G06F 9/524 710/108 |
| 6,671,713 | B2 * | 12/2003 | Northrup | G06F 9/54 709/203 |
| 8,832,711 | B1 * | 9/2014 | Chai | G06F 9/4843 718/102 |
| 2006/0005191 | A1 * | 1/2006 | Boehm | G06F 9/52 718/100 |
| 2011/0153724 | A1 * | 6/2011 | Raja | H04L 67/325 709/203 |
| 2015/0331720 | A1 * | 11/2015 | Huetter | G06F 9/544 718/104 |
| 2015/0347196 | A1 * | 12/2015 | Truong | G06F 9/524 711/114 |

OTHER PUBLICATIONS

Dechev et al., "LC/DC: Lockless Containers and Data Concurrency A Novel Nonblocking Container Library for Multicore Applications", Sep. 18, 2013, IEEE, vol. 1, pp. 625-645 (Year: 2013).*

* cited by examiner

*Primary Examiner* — Kenneth Tang
(74) *Attorney, Agent, or Firm* — Morgan, Lewis & Bockius LLP

(57) ABSTRACT

A computer-implemented method of delegating an object in an object library to a computer application having multiple execution threads includes, in certain embodiments, registering at least some of the execution threads with the object library; executing a first registered execution thread to access the object; generating delegation information; associating the object with the generated delegation information; and delegating the object to a second registered execution threads based on the delegation information, thereby ensuring sequential delegation of the object, without locking thereof, in the registered execution threads of the computer application.

24 Claims, 7 Drawing Sheets

OBJECT POOL LIBRARY FOR LOCKLESS AND SEARCHLESS EXCHANGE OF INFORMATION ACROSS MULTIPLE COMPONENTS

TECHNICAL FIELD

In various embodiments, the present invention relates generally to object-oriented computing systems, and in particular to accessing an object pool library for lockless and searchless exchange of information across multiple computer components.

BACKGROUND

An "application" is a computer program that provides a group of coordinated functions, tasks or activities to users. The performance of applications has been improved while the associated development costs have been reduced by utilizing object-oriented computing techniques. Object-oriented computing techniques differ from traditional function-oriented techniques in that small, reusable sections of program code known as "objects" can be quickly and easily combined and re-used to create new programs. The modular and re-usable aspects of objects can speed development of new programs, thereby reducing the costs associated with the development cycle. In addition, by creating and re-using a comprehensive set of well-tested objects, a more stable, uniform, and consistent approach to developing new computer programs can be achieved.

Many object-oriented computer systems support multiple concurrent execution threads each of which can independently search for and attempt to access objects in an object pool library. Two different threads, however, may attempt to access the same object simultaneously, resulting in "contention." To arbitrate between the different threads, conventional computer systems implement mutual-exclusion ("mutex") primitives to ensure that one object cannot be allocated to two different threads simultaneously. Typically, mutual-exclusion primitives rely on a locking scheme—when one thread is accessing the object, other threads are "locked" out; only when the one thread finishes its current execution is the object released and made accessible to other threads.

Searching a desired object in an object pool library, however, is already time-consuming and the delays associated with contention resolution slow performance still further. The more threads that concurrently execute, the greater will be the problem, particularly where large numbers of execution threads attempt to access the same object sequentially and/or simultaneously in an unorganized fashion. Accordingly, there is a need for an approach that allows multiple threads to access objects in an organized fashion without the need for searching and locking of objects.

SUMMARY

Embodiments of the present invention allow multiple execution threads in a computer application to access an object in an object pool library in an organized fashion utilizing a module-registration approach. In various embodiments, prior to execution of the application, the threads that will access the object during execution are "registered" with the object pool library as requester threads and/or handler threads. A requester thread delegates the object to a handler thread by, for example, encoding information about the handler thread in the object or attaching information about the handler thread to the object. A handler thread processes the object to acquire desired information and/or perform a desired function. In one implementation, the first thread that calls the object is registered as the first requester thread. During execution of the application, the first requester thread is allowed to access a free and unused object in the library, mark it as being used, encode or attach delegation information to the object, and return the object to the library. Because the delegation information includes information about a handler thread to which the object is to be delegated next, only the designated handler thread can access and process the object. In some embodiments, the handler thread is also registered as a requester thread. In this situation, the handler thread, upon completion of a process, also encodes or attaches delegation information to the object prior to returning it to the library. Again, only the handler thread to which the object is delegated can pick it up from the library.

Accordingly, the module-registration approach described herein manages the objects in the library through delegation; this obviates the need for each execution thread to independently search for the desired object in the library. In addition, through object delegation, the threads in the computer application can access and process the object in an organized, sequential manner. Further, the module-registration approach requires no locking mechanism for the object. This is because when the object is processed by the requester thread and handler thread, it is marked as being used, and thus is inaccessible to other threads. Moreover, when the object is provided with delegation information, no thread other than the one to which the object is delegated can access the object. Accordingly, the current invention significantly reduces the complexity of managing and/or delegating objects in an object pool library and additionally reduces execution latency of a computer application, simplifying and improving the efficiency of computer operation.

In one implementation, the desired object is a data-gather object and the application assesses traffic levels. By use of the module-registration approach as described above, threads in the traffic-level application may sequentially access the data-gather object to query network information, such as traffic flow, from various network nodes via a computer network. When sufficient data are collected, the application may perform a desired analysis thereon.

In various embodiments, the module-registration approach is implemented in a multi-threaded operating system that allows multiple applications to be executed in parallel. Again, via registration of the threads in each application prior to execution, the requester threads and handler threads in each application can process the object in an organized, sequential manner, and multiple applications can be executed independently and simultaneously to perform their associated functions.

Accordingly, in one aspect, the invention pertains to a computer-implemented method of delegating an object in an object library to a computer application including multiple concurrent execution threads. In various embodiments, the method includes (a) registering at least some of the execution threads with the object library; (b) executing a first one of the registered execution threads to (i) access the object in the object library, (ii) generate delegation information and (iii) associate the object with the generated delegation information; and (c) delegating the object to a second one of the registered execution threads based on the delegation information, thereby ensuring sequential delegation of the object, without locking thereof, in the registered execution threads of the computer application. In one implementation, the registration step includes creating a database entry associated with the object and storing the execution threads in the database entry. In addition, the step of associating the object with the generated delegation information includes incorporating the delegation information in the database entry.

The execution threads may be registered as requester threads and/or handler threads. For example, the first one of the registered execution threads may be a requester thread, and the second one of the registered execution threads may be a handler thread. In some embodiments, the second one of the registered execution thread is also a requester thread, and the method further includes generating, by the second one of the registered execution thread, second delegation information; associating the object with the second delegation information; and delegating the object to a third one of the registered execution threads based on the second delegation information.

In various embodiments, the method further includes processing, by the first and second ones of the registered execution threads, the object to acquire network information (e.g., a traffic load) from the first and second network nodes, respectively. The acquired network information may then be analyzed and/or reported to a network operator.

In another aspect, the invention relates to a system for delegating an object in an object library to a computer application having multiple execution threads. In various embodiments, the system includes a computer memory for storing the object library and a computer processor configured to (a) register at least some of the execution threads with the object library; (b) execute a first one of the registered execution threads to (i) access the object in the object library, (ii) generate delegation information and (iii) associate the object with the generated delegation information; and (c) delegate the object to a second one of the registered execution threads based on the delegation information, thereby ensuring sequential delegation of the object, without locking thereof, in the registered execution threads of the computer application. In one implementation, the computer processor is further configured to create a database entry associated with the object and store the execution threads in the database entry. In addition, the computer processor is configured to include the delegation information in the database entry.

In various embodiments, the computer processor is further configured to register the execution threads as requester threads and/or handler threads. For example, the first one of the registered execution threads may be a requester thread and the second one of the registered execution threads may be a handler thread. In one embodiment, the second one of the registered execution thread is also registered as a requester thread. The computer processor is further configured to generate, by the second one of the registered execution thread, second delegation information; associate the object with the second delegation information; and delegate the object to a third one of the registered execution threads based on the second delegation information.

In some embodiments, the computer processor is further configured to execute the first and second ones of the registered execution threads and process the object to acquire network information (e.g., a traffic load) from the first and second network nodes, respectively. In addition, the computer processor is further configured to analyze the acquired network information and report the analysis.

Another aspect of the invention relates to a computer-implemented method of delegating multiple computationally defined objects in an object library to multiple computer applications executing as running processes, each application having multiple concurrent execution threads. In various embodiments, the method includes (a) prior to execution of the applications, registering at least some of the execution threads in each application with the object library; and (b) substantially simultaneously executing the multiple applications by: (i) independently executing a first one of the registered execution threads in each application to access a different one of the objects in the object library; (ii) in each application, independently generating delegation information and associating the delegation information to corresponding object; and (iii) in each application, independently delegating the corresponding object to a second one of the registered execution threads based on the delegation information, thereby ensuring sequential delegation of the object, without locking thereof, in the registered execution threads of each application.

In general, as used herein, the term "substantially" means ±10% (e.g., by execution time), and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DESCRIPTION

Figure 1A:
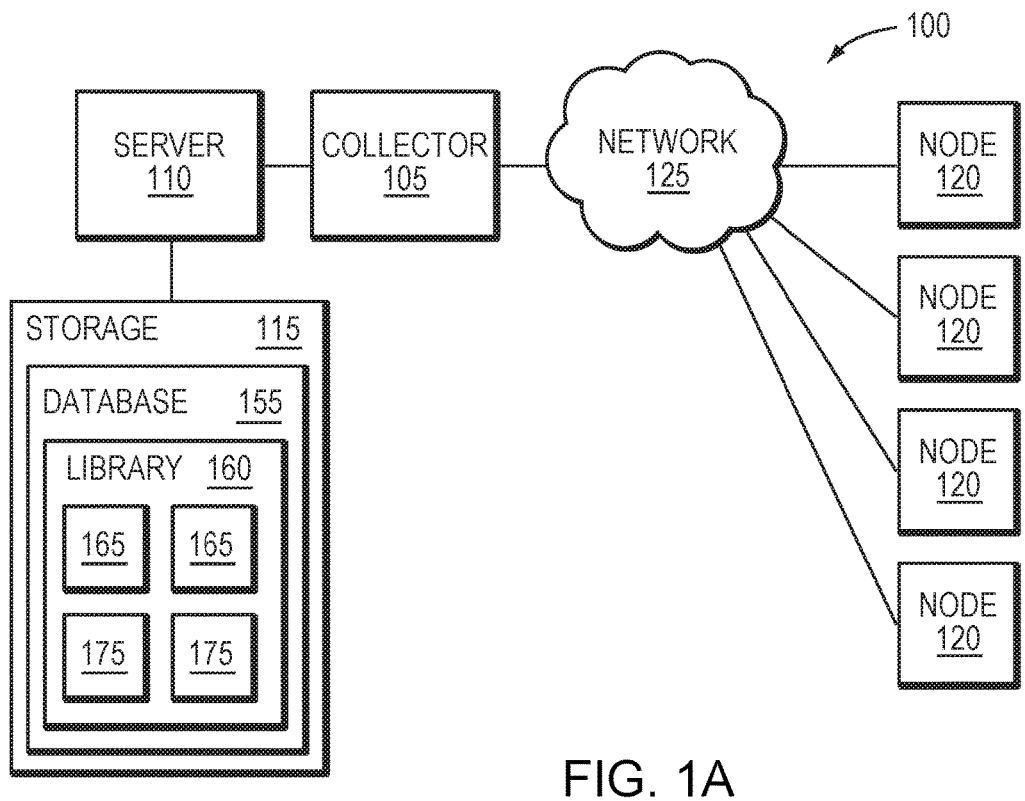
FIGS. 1A and 1B schematically illustrate multi-threaded network environments in accordance with various embodiments of the present invention.

Embodiments of the present invention relate to accessing an object pool library for lockless and searchless exchange of information in an organized, sequential fashion across multiple components in a multi-threaded environment. FIG. 1A depicts an example of a multi-threaded network environment 100 in accordance with various embodiments of the invention including a collector 105, a server 110, and a storage unit (e.g., computer memory) 115. These components, which may be realized in hardware, software or a combination, are connected to one or more network nodes 120 via a computer network 125. Each of the nodes 120 may include or consist essentially of any device deployed in computer network 125 that can control access to and use of the resources of the computer network 125. For example, a node 120 may include or consist essentially of a network appliance such as a router, gateway, switch, hub, networking server, bridge, interface controller, wireless access point, or firewall, or a computing device such as a server, a workstation, a terminal, a desktop computer, a laptop computer, a cellular phone, or a tablet computer, or any other type of device with suitable ingress and egress ports. Each node 120 may even represent another network (e.g., a LAN or WAN) containing multiple network nodes. These network nodes 120 collect information, such as traffic statistics of network flows, and output the collected records to the collector 105. Upon receiving the records, the collector 105 transmits them to the server 110, which includes or consists essentially of a computing device, for processing. For example, the server 110 may perform conventional traffic analysis on the records, and the analysis results may then be stored in the memory 115. The collector 105 may be a standalone device discrete from the server 110, or alternatively, the collector 105 and the server 110 may represent different functionalities of a common computing device. The memory 115 may include or consist essentially of one or more volatile or non-volatile storage devices, e.g., random-access memory (RAM) devices such as DRAM, SRAM, etc., read-only memory (ROM) devices, magnetic disks, optical disks, flash memory devices, and/or other solid-state memory devices. All or a portion of the memory 115 may be located remotely from the server 110, e.g., one or more storage devices connected to server 110 via network 125 or another network. As utilized herein, the term "electronic storage" (or simply "storage") broadly connotes any form of digital storage, e.g., optical storage, magnetic storage, semiconductor storage, etc. Furthermore, a record or partial record may be "stored" via storage of the record or partial record itself, a copy of the record or partial record, a pointer to the record or partial record, or an identifier associated with the record or partial record, etc.

Figure 1B:
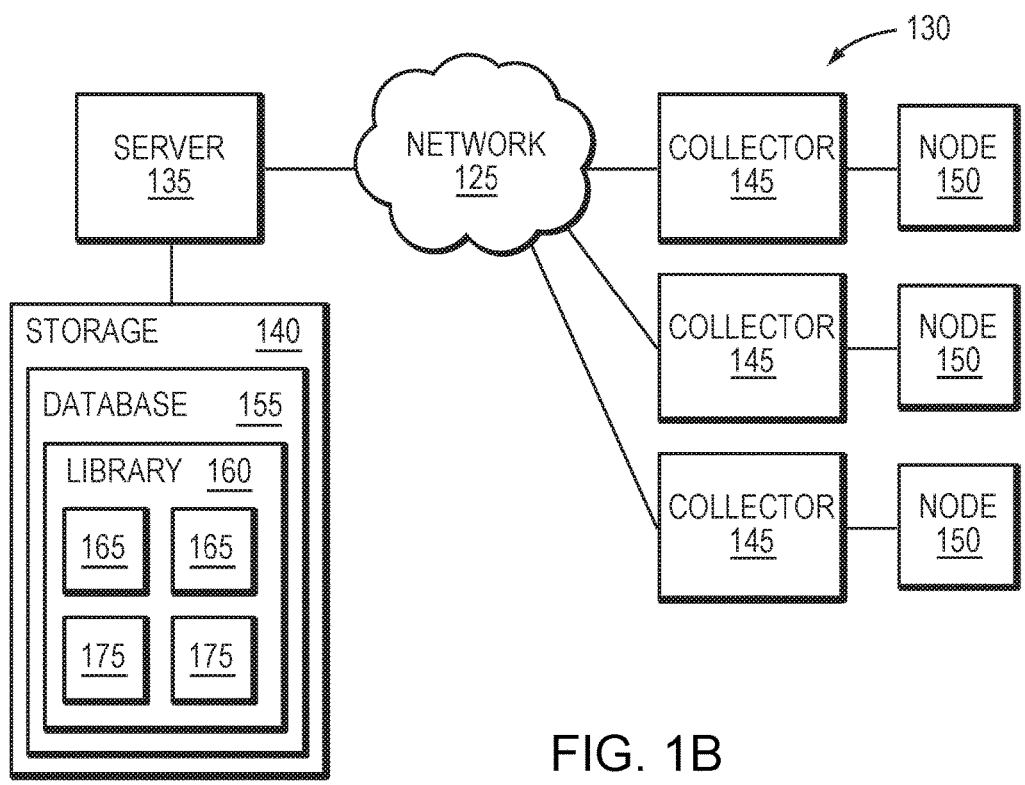

FIG. 1B depicts another example of a multi-threaded network environment 130 in accordance with various embodiments of the invention including a single central server 135, a memory 140, and multiple distributed collectors 145; each collector 145 resides near a network node 150 at the remote location. The collectors 145 collect and process the data from the nodes 150 and pass the data to the central server 135 through, for example, a secure https connection. The central server 135 may analyze and store the received data and generate reports as further described below.

The network systems 100, 130 may further include a database 155 that resides in the storages 115, 140 accessible to the servers 110, 135. The database 155 stores, for example, an object pool library 160 having multiple objects 165 therein; each object 165 may include variables, functions, data structures, processes and/or combinations thereof. In various embodiments, unlike conventional systems, the library 160 includes no execution threads for managing and/or delegating the objects 165 therein; rather, a module-registration approach as further described below is implemented to achieve this purpose. In one embodiment, the objects are directly created by the servers 110, 135. In other embodiments, the objects are created by other remote servers (e.g., Web servers or Web application servers) using a distributed object technique. Using this technique, an object in a remote server appears as if it resides in the local server, and the remote object can be freely manipulated. The distributed object "mirage" is called a proxy object (or agent object), and appears the same as the object on the remote server though it exists as an agent object rather than a real object.

In a multi-threaded environment, the servers 110, 135 may continuously query and/or receive network information, such as traffic load, from the network nodes 120. The servers 110, 135 may then execute a computer application to analyze the received information. In some embodiments, the servers 110, 135 implement an object-oriented computing system; thus, during execution of the application, modules in the application may be required to access one or more objects 165 in the pool library 160. To obviate the need for the thread(s) in each module to independently search for the desired objects 165 and lock them during processing, in one embodiment, each module in the application registers, with the library 160, its threads that require access to the objects 165 as requester threads and/or a handler threads. The registration may be established by, for example, creating database entries 175 and "storing" the threads in the entries 175. As used herein, the term "store" refers to storage of the threads, copies of the threads, pointers to the threads, or identifiers associated with the threads. A single entry may be associated with one or more objects and a single object may correspond to multiple entries. In addition, each entry may specify the status (e.g., free, used, or delegated to a specific handler thread) of the object as further described below. A requester thread may delegate the object 165 to a handler thread by, for example, encoding information about the handler thread in the object, attaching information about the handler thread to the object and/or including information about the handler thread in the object-associated entry. Consequently, the handler thread to which the object 165 is delegated may access the object based on the encoded or attached information.

Figure 2:
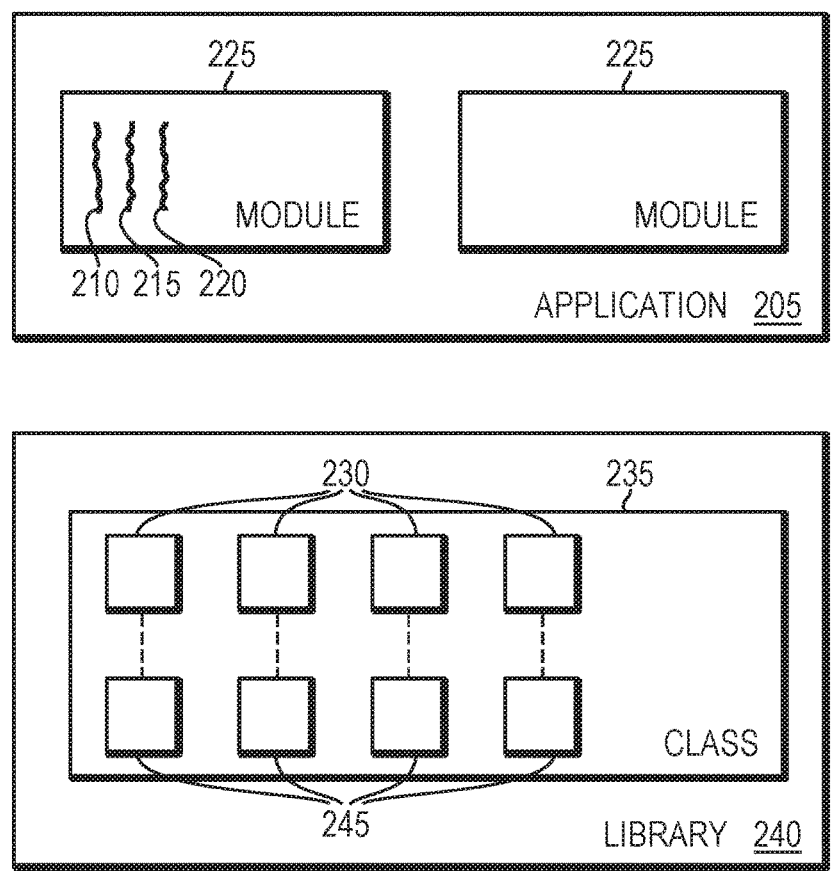
FIG. 2 depicts an example of an approach for executing a computer application utilizing a module-registration approach in accordance with various embodiments of the present invention.

FIG. 2 depicts an example of an approach for executing a computer application 205 utilizing the module-registration approach. In various embodiments, multiple execution threads 210-220 are included in one or more modules 225 of the application 205; during execution of the application, the threads 210-220 require access to an object 230 within a desired class 235 and stored, physically or logically, in an object pool library 240. Each library 240 may include one or more classes 235. In one implementation, prior to execution, the thread 210 is registered with the library 240 as a first requester thread, the thread 220 is registered as a handler thread and the thread 215 is registered as both a requester and handler thread. During execution of the application 205, the first requester thread 210 may pick up a free, unused object 230 from the class 235 in accordance with the object status specified in an object-associated entry 245, mark the object 230 as being used in its corresponding entry and process the object 230 without locking it. Once the process is complete, the requester thread 210 may then return the object 230 to the library 240 with encoded/attached information indicating the handler thread 215 as the next thread for processing the object 230. Additionally or alternatively, the requester thread 210 may specify the object status in its associated entry as being delegated to the handler thread 215. Accordingly, after the object 230 is returned to the library 240, the handler thread 215 upon execution may immediately find the delegated object 230 based on the object status in its corresponding entry and process it. Because the handler thread 215 is also registered as a requester thread, it returns the object 230 with encoded/attached delegation information about the object 230 to the handler thread 220. The handler thread 220 may then access and process the object 230, and subsequently return the object 230 to the library 240. Because the handler thread 220 is not a requester thread, no delegation information is encoded or attached to the object 230; the object 230 therefore upon returning to the library 240 is free to be accessed by other applications. After all data required by the object 230 are received from the queried nodes 120, the object 230 and/or a module in the application 210 may perform a desired analysis thereon. As used herein, the term "object" refers to a section of program code that is typically created as an instance of a particular class and can be quickly and easily combined and reused to create new program; and the term "class" refers to a template that defines a type of an object and describes the characteristics of the objects belonging thereto.

Although the discussion herein focuses on access to one object 230 in a pool library for purposes of illustration, the present invention is not limited to access to any particular number of objects. For example, a requester thread may access to multiple objects simultaneously or sequentially, and may delegate the objects to the same or different handler threads. In addition, the handler threads may simultaneously or sequentially process multiple objects that are reserved therefore from the same or different requester threads.

The module-registration approach described herein thus allows execution threads in an application to sequentially access and process a desired object via use of the registered requester and/or handler threads. This approach obviates the need to implement a conventional library thread for managing and delegating the objects in the pool library. In addition, application threads in accordance herewith are not required to search for the desired object; this may significantly reduce latency when executing the threads and the application. Further, because the object is marked as used while being accessed and/or processed by a thread, no other thread is allowed to access it. The object becomes accessible again only after it is returned to the library and is free from delegation; no locking mechanism on the object is necessary. Accordingly, this current invention advantageously allows the servers 110, 135 to continuously query and/or receive network information from various nodes 120 in an organized, sequential fashion without the need for searching and/or locking of objects in a multi-threaded environment.

Figure 3:
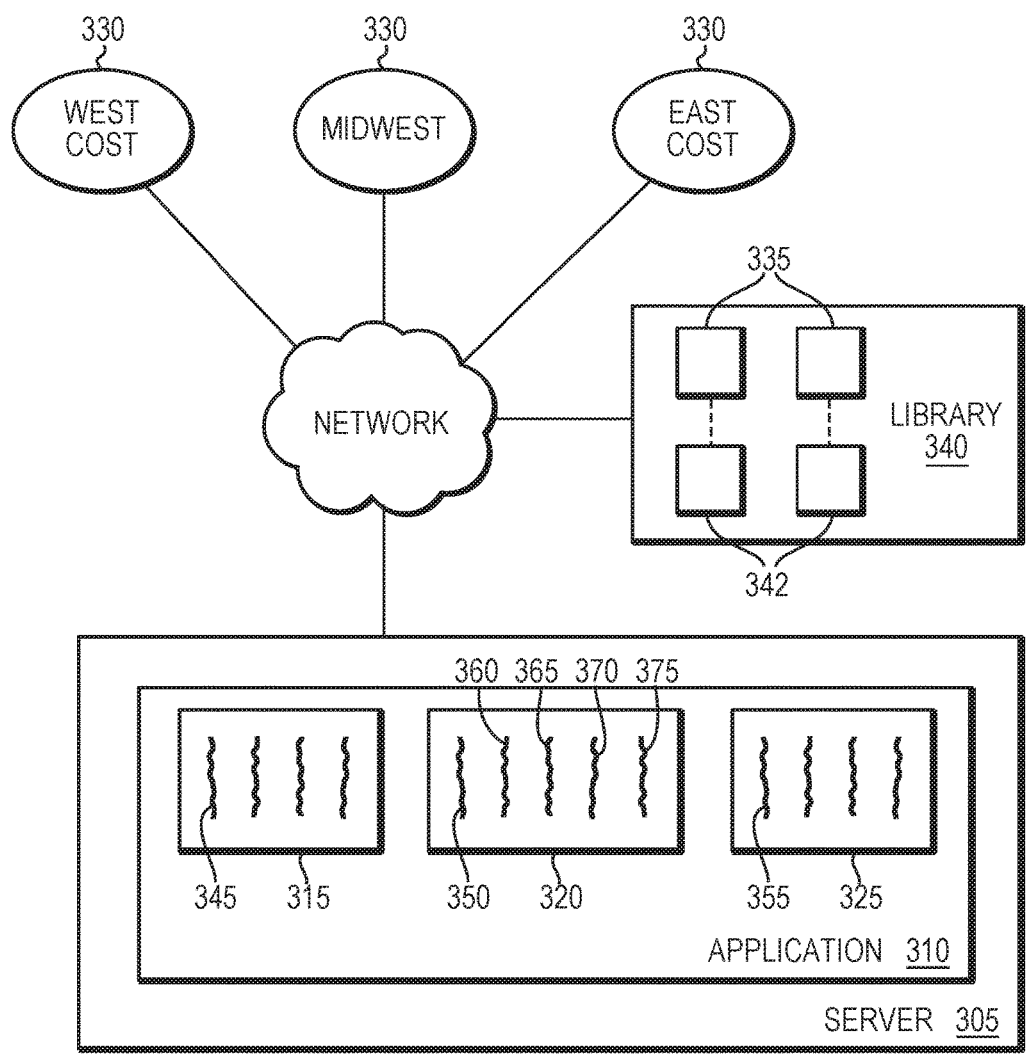
FIG. 3 illustrates an example of a system implementing a module-registration approach in accordance with various embodiments of the present invention.

FIG. 3 illustrates an example of a system 300 implementing the module-registration approach as described above for accessing an object pool library for exchange of information across multiple network nodes in accordance with the present invention. In various embodiments, the server 305 implements a traffic-assessment application 310 including three modules 315-325 for collecting traffic data from various network nodes 330 located at three different regions—for example, one node on the West Coast (e.g., California), one in the Midwest (e.g., Iowa), and one on the East Coast (e.g., New York), respectively. Each module is required to access a data-gathering object 335 in an object pool library 340 for actively querying load information (e.g., queue size) from the network nodes 330. When sufficient information is collected, the data-gathering object 335 may compute an estimate of network-wide traffic. In some embodiments, prior to collection of the traffic load data, modules 315 and 320 register the threads contained therein as both requester and handler threads with the object library 340 and module 325 registers its thread as a handler thread with the library. Again, the thread-registration step may be performed by creating a database entry 342 associated with the data-gathering object 335; the entry 342 may store the registered threads in a memory and specify the status of the object 335. When the traffic-assessment application 310 is executed, a thread 345 registered as a requester and a handler in module 315 first accesses the data-gathering object 335 which queries traffic load information from the node on the West Coast. The thread 345 may process and/or load the received information into the object 335 and subsequently delegates the object 335 to a thread 350 registered as both a requester and a handler in the module 320. After the object 335 is released from the thread 345 to the library, the thread 350 which the object 335 is delegated to may access the object 335 to query traffic load information from a node in the Midwest. Again, the thread 350 may process and load information received from the Midwest node into the object 335 and delegate the object 335 to a subsequent handler thread 355 in the module 325. The handler thread 355 then accesses the object 335 and queries traffic load information on the East Coast. Finally, when all required data slots in the object 335 have been loaded with data collected from the nodes, the object 335 and/or the application 310 may execute an encapsulated method that computes overall network traffic from the gathered load data and report it to the server operator.

Each region may include more than one network node; for example, the Midwest may include nodes in Chicago, Detroit, and Columbus. In this case, the module 320 may include three threads 360, 365, 370, each associated with one of the Midwest nodes, and a separate thread 375 for designating one of the threads 360, 365, 370 to the object 335. The thread 375 may be registered as a handler thread to access the object 335 after it is returned from the thread 345 to the library 340 as well as a requester thread to delegate the object 335 to a selected one of the threads 360, 365, 375 for acquiring traffic load data from one of the Midwest nodes. In this way, the thread 345 in the module 315, instead of designating a specific Midwest node to the data-gathering object 335, may provide a selection constraint via delegation of the object 335 to the handler thread 375. The handler thread 375 may then select one of the threads 360, 365, 370 registered as handler threads to access the object 335, which subsequently queries traffic load information from the node associated with the selected thread. Upon receiving information from the queried node, the selected thread acts as a requester thread and delegates the object 335 to the handler thread for querying traffic load information from an East Coast node. This approach thus advantageously provides flexibility for the module to select a queried node complying with the selection constraint.

Figure 4:
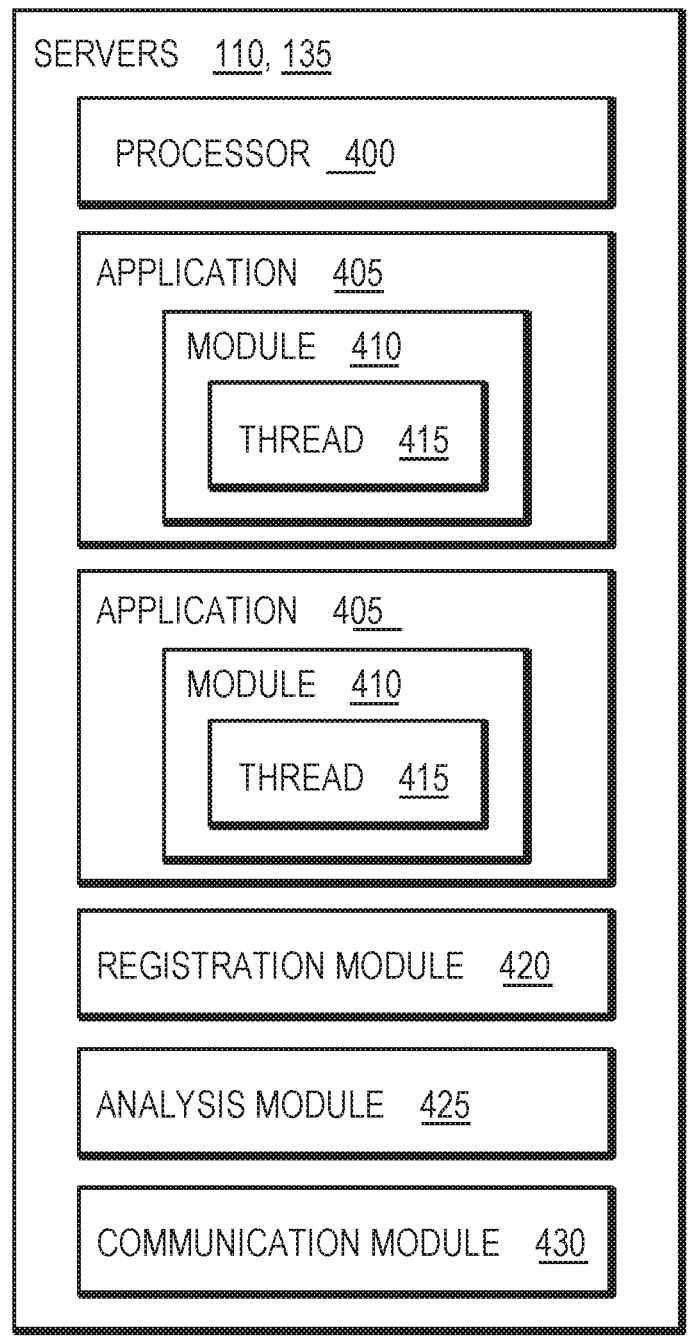
FIG. 4 is a block diagram of a server for executing a module-registration approach in accordance with various embodiments of the present invention.

FIG. 4 illustrates the components of representative servers 110, 135 in accordance with embodiments of the invention. As shown, the servers 110, 135 may include a conventional computer processor 400 that executes or controls various applications 405 for acquiring, analyzing and/or reporting information received from one or more network nodes 120; each application 405 may include at least one module 410 having at least one execution thread 415 for performing the desired function. In addition, the servers 110, 135 may include various other modules (e.g., program modules and/or hardware modules) that perform functions in accordance with of embodiments of the invention. For example, the servers 110, 135 may include a registration module 420 for registering the module(s) 410 of the applications 405 with an object pool library by creating database entries that store the registered threads and/or specify statuses of the associated objects. The servers 110, 135 may also include an analysis module 425 for analyzing network data received from the nodes 120. In various embodiments, the analysis module 425 is not a part of the servers 110, 135 and is instead a part of a dedicated device (another computing device) interconnected to the servers 110, 135 and/or the memory 115.

In various embodiments of the invention, the servers 110, 135 may also include a communications module 430 for electronic communication with the nodes 120 connected to network 125. The communications module 430 may thus include one or more communications interfaces such as wired and/or wireless network interfaces. The communications module 430 may also facilitate interaction with one or more users of system 100 that are local to or remotely positioned from the servers 110, 135. Thus, the communications module 430 may also include, e.g., one or more input devices such as a keyboard, mouse or other pointing device, or microphone (for spoken input) and/or one or more output devices such as a display, printer, speaker, etc.

Figure 5:
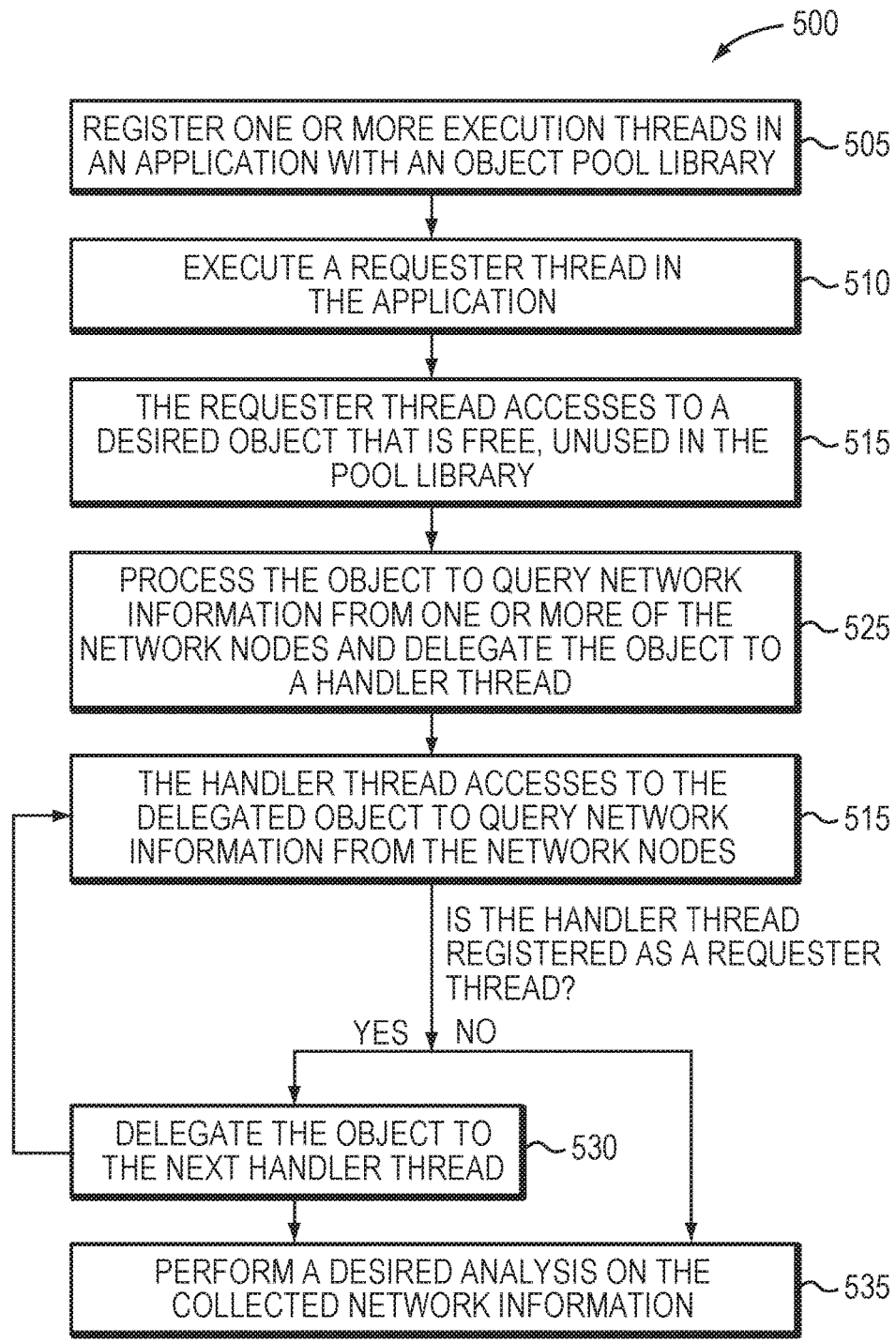
FIG. 5 is a flow chart illustrating approaches that provide multiple modules in a computer application with sequential access to an object in an object pool library in accordance with various embodiments of the present invention.

FIG. 5 depicts an example of a method 500 for providing multiple modules in a computer application with organized, sequential access to one or more objects in an object pool library. While the various steps of method 500 are depicted as occurring in a particular order, the depicted order and the number and definition of the steps may be varied depending on the implementation. Other embodiments of the invention feature more or fewer steps and/or steps performed in a different order. As shown, in a first step 505, one or more modules of the applications that may require access to one or more objects in a desired class in an object pool library may register, via the registration module 415, one or more execution threads contained therein with the library for accessing the object(s). The registration may be established by creating one or more entries associated with the object(s), each entry storing the threads and specifying the status(es) of the object(s). Each thread may be registered as a requester thread and/or a handler thread. In a second step 510, the application is initialized to execute a requester thread therein. In a third step 515, the executed requester thread accesses a desired object that is free and unused (indicated by, for example, the object status specified in the object-associated entry) in the pool library. In a fourth step 520, the requester thread processes the object to query network information from one or more of the network nodes 120 and, upon receiving the information, delegates the object to a handler thread by encoding or attaching the delegation information to the object and/or including the delegation information in the object-associated entry. In addition, the received network information may be stored in the memory 115. In a fifth step 525, the handler thread to which the object is delegated upon execution accesses the object based on the encoded/attached delegation information and/or delegation information specified in the object-associated entry to query network information from the network node(s) 120 that may be the same or different from the nodes 120 queried in step 520. Again, the queried information upon receipt may be stored in the memory 115. If the handler thread is also registered as a requester thread, it may delegate the object to the next handler thread (in a sixth step 530). Steps 525 and 530 may be iteratively performed for every thread that is registered as both a requester and handler thread until the object has been processed and/or delegated by all requester threads in the application. In the seventh step 535, once the last handler thread registered to process the object has queried and received network information from the node(s) 120, the object and/or application may perform a desired analysis, via the analysis module 425, of the collected network information. The result may then be displayed and/or reported to a server operator. In addition, the status of the object may then be marked, in its associated entry, as free and unused such that a requester thread in another application may access it.

Figure 6A:
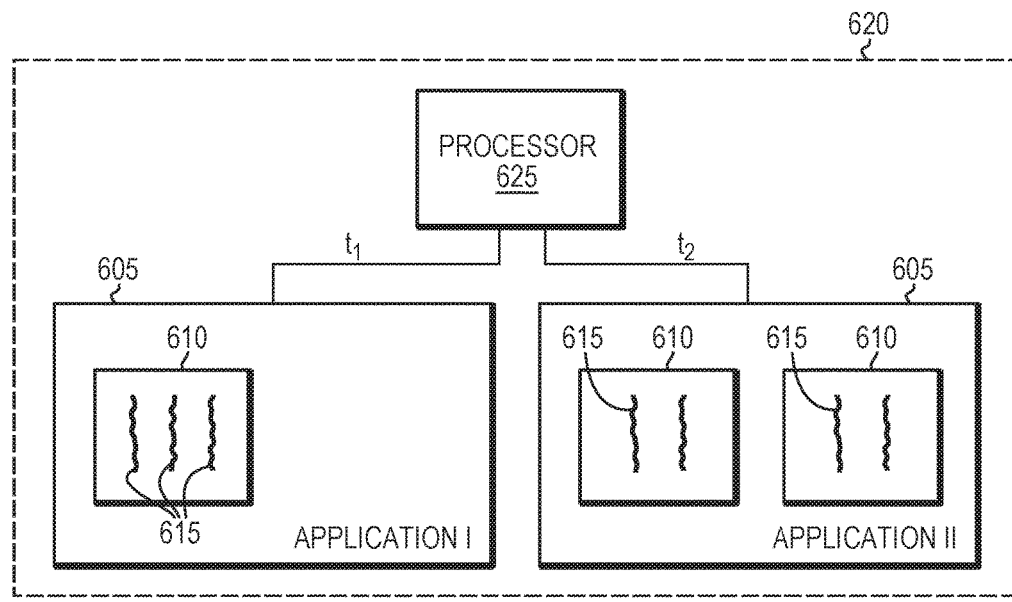
FIGS. 6A and 6B schematically illustrate multi-threaded operating systems in accordance with various embodiments of the present invention.
Figure 6B:
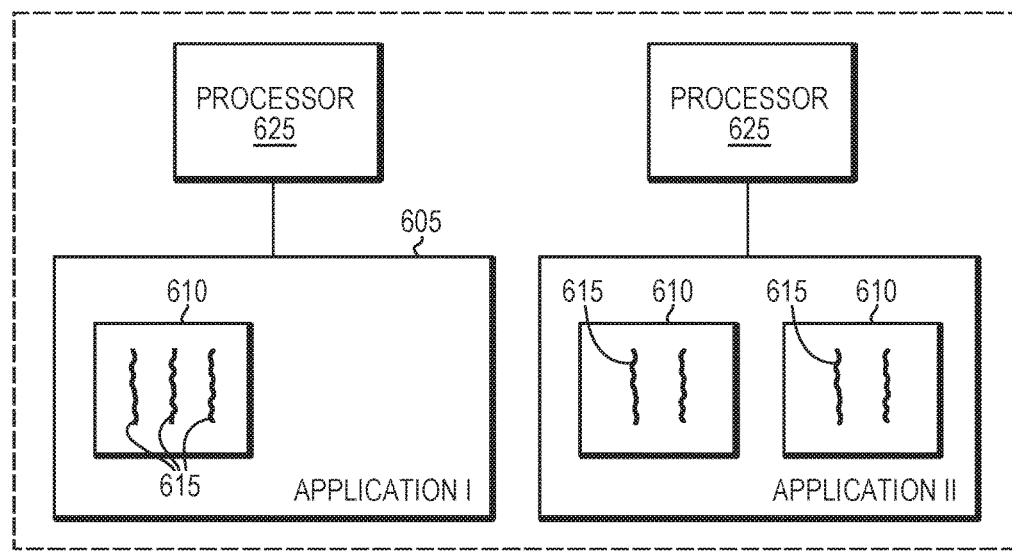

In some embodiments, the servers 110, 135 include multi-threaded operating systems that allow multiple applications to be executed in parallel. For example, referring to FIG. 6A, each application 605 may include one or more modules 610 that each has one or more execution threads 615; a server 620 may manage and execute multiple threads in the same or different applications substantially simultaneously. This may be achieved using a single processor or multiple processors. For example, in one embodiment, the server 620 includes a single processor 625 that implements multi-threading by time slicing—that is, the processor 625 switches execution between different applications. Because switching generally occurs very often and rapidly, the operator perceives the applications as executing substantially simultaneously. Referring to FIG. 6B, in another embodiment, the server 620 includes multiple processors 630-640, where each processor executes a separate thread; multiple threads can then be executed in parallel.

To simultaneously execute multiple applications in a multi-threaded environment where the network information may be continuously transmitted from multiple network nodes to the server via the network 125, in various embodiments, the module-registration approach as described above is implemented in the multi-threaded operating systems. For example, prior to execution of the applications 605, each thread 615 of the applications 605 is registered with an object pool library, via the registration module 415, as a requester thread and/or a handler thread. Again, the registration may be established by creating one or more database entries associated with the objects in the library and storing the registered threads in the entries. During execution of the applications 605, a requester thread from each application picks up a free, unused object from the library based on the object status indicated in its associated entry, processes the object without locking it, and then returns the object to the library with encoded information (in the object or its associated entry) indicating delegation of the object to a handler thread. The handler threads to which the objects are delegated in the applications may then immediately find the objects in the library based on the delegation information stored in the entries and process them. If the handler threads are also registered as requester threads, they attach delegation information to the objects and return the objects for access by other handler threads. After the last registered handler threads have completed processing of the objects, the objects are returned to the library as free and unused by, for example, adjusting their statuses in the associated entries to free and unused. After all data required by the objects are received, each application may independently perform the analysis for which it was configured. Accordingly, the requester threads and handler threads in each application can process the object in an organized, sequential manner and multiple applications can be executed independently and simultaneously. Again, this approach also obviates the need for the applications in the multi-threaded operating systems to search and/or lock of objects altogether.

Figure 7:
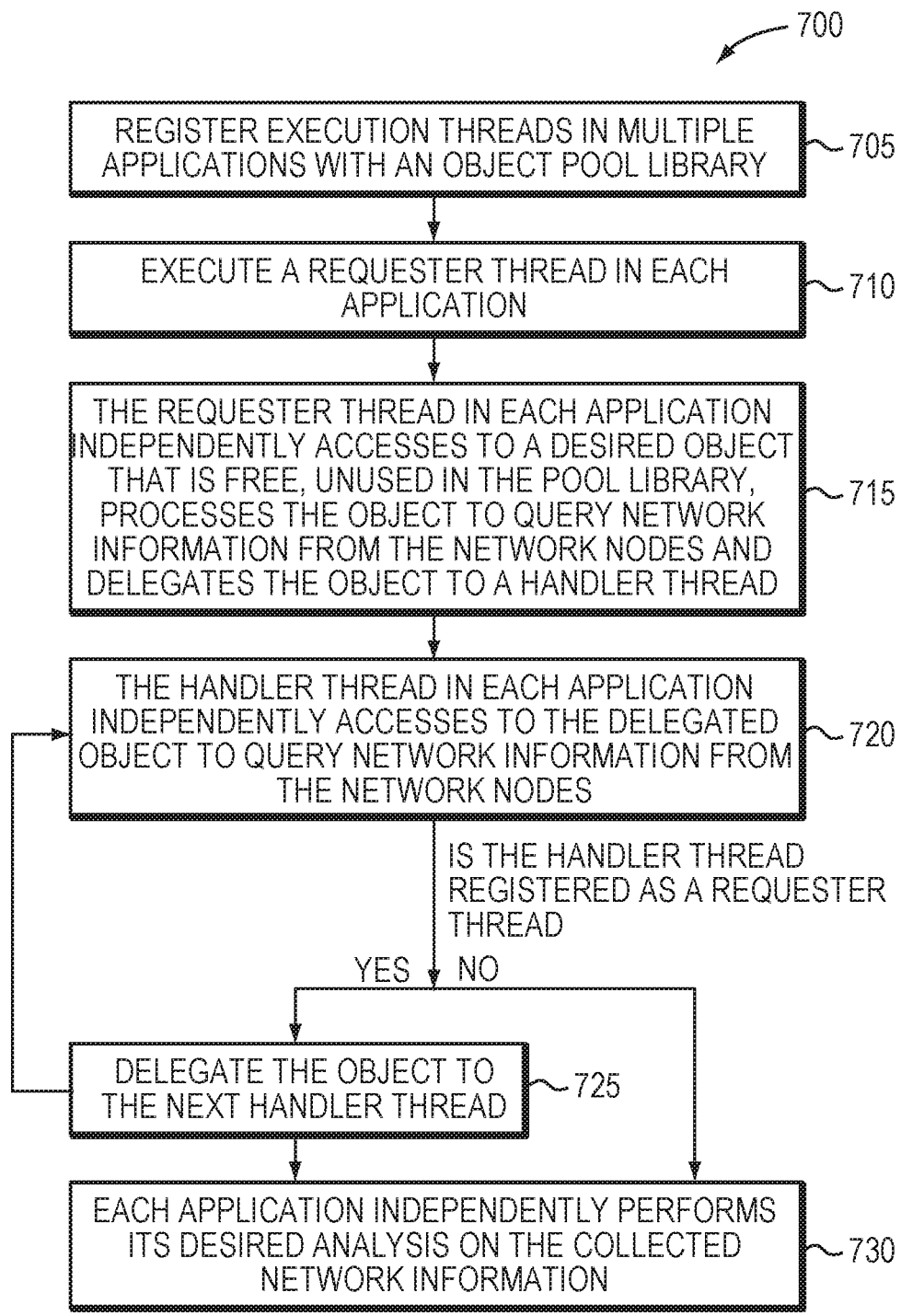
FIG. 7 is a flow chart illustrating approaches that allow multiple computer applications to be simultaneously executed in an organized, sequential manner in accordance with various embodiments of the present invention.

FIG. 7 depicts an example of a method 700 for providing multiple applications to be substantially simultaneously executed in an organized, sequential manner in accordance with various embodiments. In a first step 705, execution threads of the applications that may call one or more objects of a desired class are registered, via the registration module 415, with an object pool library as requester threads and/or handler threads. The registration may be established by creating one or more database entries associated with the objects and storing the registered threads therein. In a second step 710, a requester thread in each application is executed to access a desired object that is free and unused (indicated by, for example, the object status specified by its associated entry) in the pool library. In a third step 715, the requester thread in each application independently processes the object to query network information from one or more of the network nodes 120 and, upon receiving the information, delegates the object to a handler thread in each application. The delegation information may be encoded/attached to the object and/or included in the object-associated entry. In a fourth step 720, the handler thread in each application to which the object is delegated independently accesses the object in accordance with the delegation information to further query network information from the network node(s) 120, which may be the same or different from the nodes 120 queried in step 715. If the handler thread is also registered as a requester thread, it may delegate the object to a next handler thread in the application (in a fifth step 725). Steps 720 and 725 may be iteratively performed for every thread that registered as both a requester and a handler thread until the object has been processed and/or delegated by all requester threads in each application. In the sixth step 730, each application may independently perform its analysis, via the analysis module 425, on the queried network information. The results may then be displayed and/or reported to a server operator. It should be noted that while the various steps of method 700 are depicted as occurring in a particular order, the depicted order and the number and definition of the steps may be varied depending on the implementation. Other embodiments of the invention feature more or fewer steps and/or steps performed in a different order.

Various embodiments of the invention are implemented via a computer-based system that includes one or more computing devices (e.g., computers, servers, network appliances), each of which includes a processor and utilizes various program modules. Program modules may include or consist essentially of computer-executable instructions that are executed by a conventional computer or processing unit. Generally, program modules include routines, programs, threads, objects, components, data structures, etc. that performs particular tasks or implement particular abstract data types.

Those skilled in the art will appreciate that embodiments of the invention may be practiced with various computer system configurations, including multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote computer-storage media including memory storage devices.

Thus, systems in accordance with embodiments of the present invention may include or consist essentially of one or more general-purpose computing devices each in the form of a computer or network appliance including a processing unit (or "processor" or "computer processor"), a system memory, and a system bus that couples various system components including the system memory to the processing unit. Computers typically include a variety of computer-readable media that can form part of the system memory and be read by the processing unit. By way of example, and not limitation, computer readable media may include computer storage media and/or communication media. The system memory may include computer storage media in the form of volatile and/or nonvolatile memory such as read only memory (ROM) and random access memory (RAM). The system memory may also include locally or remotely hosted databases and/or other storage devices, e.g., a storage area network (SAN). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the example of an operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of embodiments of the invention.

Various components of systems in accordance with embodiments of the invention may be interconnected with each other and with other computers and/or network appliances (e.g., routers, switches, etc.) via a computer network. As used herein, a "computer network" or "network" is any wired and/or wireless configuration of intercommunicating computational nodes, including, without limitation, computers, switches, routers, firewalls, personal wireless devices, etc., and including local-area networks, wide-area networks, the Internet, cellular networks, satellite networks, and telecommunication and public telephone networks. Networks in accordance with embodiments of the present invention may be implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), time division multiple access (TDMA), Bluetooth, Wi-Fi, voice over internet protocol (VOIP), Wi-MAX, etc.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A computer-implemented method of delegating an object in an object library to a computer application comprising a plurality of concurrent execution threads, the method comprising:
    (a) registering at least some of the execution threads with the object library;
    (b) executing a first one of the registered execution threads to (i) access the object in the object library, (ii) generate delegation information about one of the registered execution threads to which the object is to be delegated next and (iii) associate the object with the generated delegation information; and
    (c) delegating the object to a second one of the registered execution threads based on the delegation information, thereby ensuring sequential delegation of the object, without locking or searching thereof, in the registered execution threads of the computer application.

2. The method of claim 1, wherein the execution threads are registered as at least one of requester threads or handler threads.

3. The method of claim 2, wherein the first one of the registered execution threads is a requester thread.

4. The method of claim 2, wherein the second one of the registered execution threads is a handler thread.

5. The method of claim 4, wherein the second one of the registered execution thread is a requester thread, the method further comprising:
    generating, by the second one of the registered execution thread, second delegation information;
    associating the object with the second delegation information; and
    delegating the object to a third one of the registered execution threads based on the second delegation information,
    wherein the third one of the registered execution threads is a handler thread.

6. The method of claim 1, further comprising processing, by the first one of the registered execution threads, the object to acquire network information from a first network node.

7. The method of claim 6, further comprising processing, by the second one of the registered execution threads, the object to acquire network information from a second network node different from the first network node.

8. The method of claim 7, further comprising analyzing the acquired network information and reporting the analysis.

9. The method of claim 7, wherein the network information is a traffic load associated with the network node.

10. The method of claim 1, wherein the registration step comprises creating a database entry associated with the object and storing the execution threads in the database entry.

11. The method of claim 10, wherein the step of associating the object with the generated delegation information comprises including the delegation information in the database entry.

12. A system for delegating an object in an object library to a computer application comprising a plurality of execution threads, the system comprising:
    a computer memory for storing the object library; and
    a computer processor configured to:
        (a) register at least some of the execution threads with the object library;
        (b) execute a first one of the registered execution threads to (i) access the object in the object library, (ii) generate delegation information about one of the registered execution threads to which the object is to be delegated next and (iii) associate the object with the generated delegation information; and
        (c) delegate the object to a second one of the registered execution threads based on the delegation information, thereby ensuring sequential delegation of the object, without locking or searching thereof, in the registered execution threads of the computer application.

13. The system of claim 12, wherein the computer processor is further configured to register the execution threads as at least one of requester threads or handler threads.

14. The system of claim 13, wherein the first one of the registered execution threads is a requester thread.

15. The system of claim 13, wherein the second one of the registered execution threads is a handler thread.

16. The system of claim 15, wherein the second one of the registered execution thread is a requester thread, the computer processor being further configured to:
    generate, by the second one of the registered execution thread, second delegation information;
    associate the object with the second delegation information; and
    delegate the object to a third one of the registered execution threads based on the second delegation information, wherein the third one of the registered execution threads is a handler thread.

17. The system of claim 12, wherein the computer processor is further configured to execute the first one of the registered execution threads and process the object to acquire network information from a first network node.

18. The system of claim 17, wherein the computer processor is further configured to execute the second one of the registered execution threads and process the object to acquire network information from a second network node different from the first network node.

19. The system of claim 18, wherein the computer processor is further configured to analyze the acquired network information and report the analysis.

20. The system of claim 18, wherein the network information is a traffic load associated with the network node.

21. The system of claim 12, wherein the computer processor is further configured to create a database entry associated with the object and store the execution threads in the database entry.

22. The system of claim 21, wherein the computer processor is further configured to include the delegation information in the database entry.

23. A computer-implemented method of delegating a plurality of computationally defined objects in an object library to a plurality of computer applications executing as running processes, each application comprising a plurality of concurrent execution threads, the method comprising:
  (a) prior to execution of the applications, registering at least some of the execution threads in each application with the object library; and
  (b) substantially simultaneously executing the plurality of application by:
    (i) independently executing a first one of the registered execution threads in each application to access a different one of the objects in the object library;
    (ii) in each application, independently generating delegation information about one of the registered execution threads to which the object is to be delegated next and associating the delegation information to corresponding object; and
    (iii) in each application, independently delegating the corresponding object to a second one of the registered execution threads based on the delegation information, thereby ensuring sequential delegation of the object, without locking or searching thereof, in the registered execution threads of each application.

24. The method of claim 5, wherein the third one of the registered execution threads is a requester thread.

* * * * *